United States Patent [19]

Hermann et al.

[11] 3,742,074

[45] June 26, 1973

[54] PROCESS FOR THE PREPARATION OF AROMATIC TRIFLUOROMETHYL COMPOUNDS OF THE BENZENE SERIES

[76] Inventors: Hans Hermann; Helmut Lindner, both of c/o Farbwerke Hoechst, Frankfurt/Main, Germany

[22] Filed: Dec. 29, 1970

[21] Appl. No.: 102,532

[30] Foreign Application Priority Data
Dec. 31, 1969   Germany................... P 19 65 782.0

[52] U.S. Cl............................. 260/651 F, 252/426
[51] Int. Cl............................................ C07c 25/14
[58] Field of Search................................ 260/651 F

[56] References Cited
FOREIGN PATENTS OR APPLICATIONS
137,908   9/1960   U.S.S.R. ......................... 260/651 F

OTHER PUBLICATIONS

Brown et al. J. Chem. Soc. 1949 pp. 95-97, Call No. QD1.G6.

Hudlicky, Chemistry of Organic Fluorine Compounds, Page 89 (1962).

*Primary Examiner*—Daniel D. Horwitz
*Attorney*—Curtis, Morris & Safford

[57] ABSTRACT

The preparation of trifluoromethyl compounds of the benzene series from the trichloromethyl derivatives and hydrogen fluoride is improved by using hexamethylene tetramine as a catalyst. The products are useful and versatile organic intermediates for dyestuffs.

9 Claims, No Drawings

PROCESS FOR THE PREPARATION OF AROMATIC TRIFLUOROMETHYL COMPOUNDS OF THE BENZENE SERIES

The present invention provides an improved process for the preparation of aromatic trifluoromethyl compounds of the benzene series.

It is known that compounds that carry one or several trichloromethyl groups linked to an aromatic nucleus can be converted into the corresponding trifluoromethyl compounds by means of hydrogen fluoride (cf. German Pat. Nos. 575,593 and 1,138,391, U.S. Pat. No. 3,136,822 and Houben-Weyl "Methoden der Organischen Chemie," vol. 5/3, pages 121–123). When the reaction is carried out on an industrial scale in steel apparatuses, in many cases a considerable amount of resinification products is obtained in addition to the trifluoromethyl compounds, and these products bring about a decrease in yield and, in many cases, also operational troubles. Thus, the yield of the trifluoromethyl compound generally varies, from batch to batch, from about 70 to 80 percent of the theoretical yield. Sometimes, the yield is even below 50 percent without tangible reasons.

It has now been found that aromatic trifluoromethyl compounds of the benzene series can be obtained in the same good yield over a prolonged period of time even in steel apparatuses by a reaction of the corresponding trichloromethyl compounds with hydrogen fluoride, when adding hexamethylene tetramine to the reaction mixture.

The process of the invention is especially suitable for the preparation of trifluoromethyl compounds of the general formula

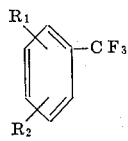

in which $R_1$ and $R_2$ each is hydrogen or chlorine or trifluoromethyl, by a reaction of the corresponding trichloromethyl compounds with hydrogen fluoride under addition of hexamethylene tetramine.

Hexamethylene tetramine (urotropine) is advantageously added to the reaction mixture in an amount of from about 0.005 to 1 percent by weight, preferably from 0.05 to 0.5 percent by weight, calculated on the amount of the trichloromethyl compound used. It has proved to be advantageous to add the hexamethylene tetramine in the form of solutions in organic solvents, for example chloroform, and preferably in lower aliphatic carboxylic acids, advantageously glacial acetic acid, but other carboxylic acids, for example propionic acid or butyric acid, may also be used.

Examples of trifluoromethyl compounds that can be prepared from the corresponding trichloromethyl compounds according to the invention are the following: Benzotrifluoride, o-, m- or p-chloro-benzotrifluoride, 2,4-dichloro-benzotrifluoride, 1,3- or 1,4-bis-trifluoromethyl-benzene and 1,2,4-tris-trifluoromethyl-benzene.

The reaction of the trichloromethyl compounds with hydrogen fluoride and the subsequent work-up of the reaction mixture and the isolation of the corresponding trifluoromethyl compounds are carried out according to known methods, for example as disclosed in the above-cited references. The reaction is advantageously carried out at a temperature of from about 100° to 170° C, preferably from about 120° to 150° C. From about 3 to 6 mols, preferably about 5 mols, of hydrogen fluoride are generally used per mol of starting compound and trichloromethyl group.

According to the present process, the trifluoromethyl compounds are generally obtained in a yield that is substantially higher than that achieved according to hitherto known industrial processes. The yields are generally in the range of from about 80 to 96 percent of the theoretical yields. Above all, the process of the invention provides the trifluoromethyl compounds in always the same yields. Since no or almost no resinification products are formed, this process can, moreover, be operated in a substantially safer and simpler manner than known processes could.

The following Examples serve to illustrate the invention, the parts and percentages being by weight unless stated otherwise.

EXAMPLE 1

In a pressure-resistant steel vessel provided with reflux condenser, which contained 400 parts of benzotrichloride, a solution of 0.3 part of hexamethylene tetramine in 1 part of glacial acetic acid was introduced and then 160 parts of hydrogen fluoride were added. The temperature in the autoclave was raised to 125° C and the internal pressure rose to about 40 atmospheres gage. In the course of 48 hours, hydrogen chloride formed during the reaction was allowed to escape and was removed from the waste gas by washing it with water. The crude product remaining in the autoclave was then purified by steam distillation.

Benzotrifluoride (being not miscible with water) was separated from the distillate, dried and fractionated. 316 parts of benzotrifluoride were obtained, corresponding to a theoretical yield of 93 percent.

Without the addition of hexamethylene tetramine, the yields, that varied from batch to batch, were in the range of from 70 to 80 percent of the theoretical yield.

EXAMPLE 2

Instead of 400 parts of benzotrichloride, 400 parts of p-chloro-benzotrichloride were introduced into a steel autoclave and, after a solution of 0.3 part of hexamethylene tetramine in 1 part of glacial acetic acid had been added, the mixture was reacted as disclosed in Example 1 with 160 parts of hydrogen fluoride. The reaction mixture was worked up as disclosed in Example 1. 302 parts of p-chloro-benzotrifluoride were obtained, corresponding to a theoretical yield of 96 percent.

Without the addition of hexamethylene tetramine, the product was obtained in a yield, that varied from batch to batch, of from 70 to 80 percent of the theoretical yield.

EXAMPLE 3

400 Parts of 1,3-bis-trichloromethyl benzene were introduced into a steel autoclave. A solution of 0.3 part of hexamethylene tetramine in 4 parts of chloroform and then 180 parts of hydrogen fluoride were added. The reaction and the work-up were carried out as disclosed in Example 1. 234 parts of 1,3-bis-trifluoromethyl-benzene, corresponding to a theoretical yield of 86 percent, were obtained.

Without the addition of hexamethylene tetramine, the product was obtained in a yield, that varied from batch to batch, of from about 70 to 80 percent of the theoretical yield.

We claim:

1. In a process for the preparation of a compound of the formula

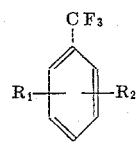

in which $R_1$ and $R_2$ are hydrogen, chlorine or trifluoromethyl by reacting a compound of the formula

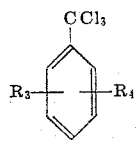

in which $R_3$ and $R_4$ are hydrogen, chlorine or trichloromethyl, with hydrogen fluoride at elevated pressure and a temperature of about 100° to about 170° C., the improvement comprising the use of hexamethylenetetramine as a catalyst in an effective amount.

2. The process as claimed in claim 1, wherein about 0.005 to about 1 percent by weight of hexamethylenetetramine, referred to trichloromethyl compound, are used.

3. The process as claimed in claim 1, wherein about 0.05 to about 0.5 percent by weight of hexamethylenetetramine, referred to trichloromethyl compound, are used.

4. The process as claimed in claim 1, wherein the catalyst is dissolved in an organic solvent that is inert towards the starting compounds and the products.

5. The process as claimed in claim 1, wherein the catalyst is dissolved in a lower alkane carboxylic acid.

6. The process as claimed in claim 1, wherein the catalyst is dissolved in acetic acid.

7. The process as claimed in claim 1, wherein the temperature is about 120° C to about 150° C.

8. The process as claimed in claim 1, wherein about 3 to about 6 mols of hydrogen fluoride are used per each trichloromethyl group present in the starting compound.

9. The process as claimed in claim 1, wherein about 5 mols of hydrogen fluoride are used per each trichloromethyl group present in the starting compound.

* * * * *